Jan. 4, 1938.    W. ZEH    2,104,064

SENSITIZING OF SILVER HALIDE EMULSIONS

Filed Oct. 10, 1932

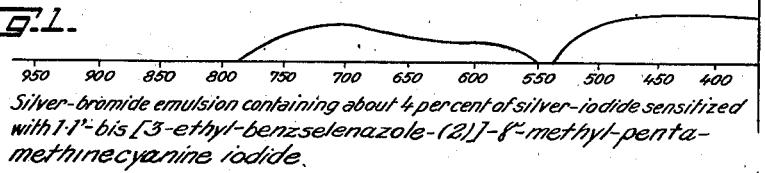

Fig. 1.

Silver-bromide emulsion containing about 4 per cent of silver-iodide sensitized with 1·1'-bis[3-ethyl-benzselenazole-(2)]-δ-methyl-pentamethinecyanine iodide.

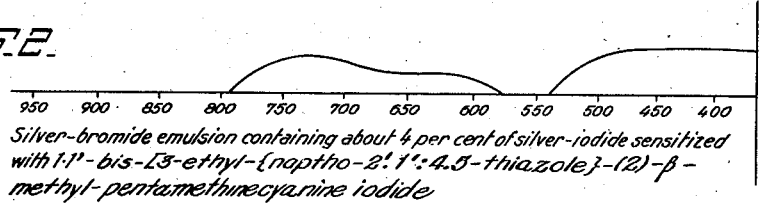

Fig. 2.

Silver-bromide emulsion containing about 4 per cent of silver-iodide sensitized with 1·1'-bis-[3-ethyl-(naptho-2'·1':4.5-thiazole)-(2)-β-methyl-pentamethinecyanine iodide

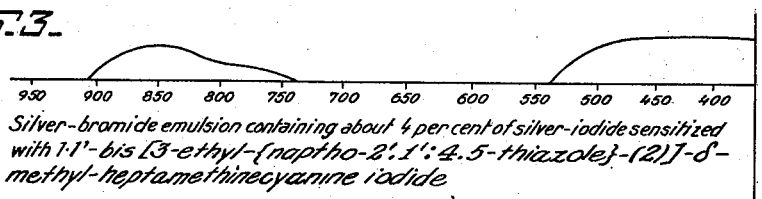

Fig. 3.

Silver-bromide emulsion containing about 4 per cent of silver-iodide sensitized with 1·1'-bis[3-ethyl-(naptho-2'·1':4.5-thiazole)-(2)]-δ-methyl-heptamethinecyanine iodide Inventor:
Walter Zeh,
By    Attorney
Philip S. Hopkins.

Patented Jan. 4, 1938

2,104,064

UNITED STATES PATENT OFFICE 2,104,064

SENSITIZING OF SILVER-HALIDE EMULSIONS

Walter Zeh, Dessau in Anhalt, Germany, assignor to Agfa Ansco Corporation, Binghamton, N. Y., a corporation of New York Application October 10, 1932, Serial No. 637,131
In Germany July 28, 1931

7 Claims. (Cl. 95—7)

My present invention relates to sensitizing of photographic emulsions.

One of its objects is to provide such an emulsion the sensitiveness of which is raised over the range of wave lengths to which the emulsion is normally sensitive. Further objects will be seen from the detailed specification following hereafter. Reference is made to the accompanying drawing which instances the spectral region to which a silver-halide gelatin emulsion sensitized by my new dyes is sensitive and part of the individual sensibility of the used emulsion.

I have found that a silver-halide emulsion containing a cyanine dye of the general formula:

*Formula 1*

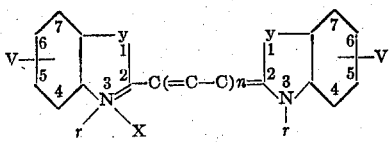

V=H, alkyl, OH, oxalkyl, substituted amino groups, benzene,
$y$=S, Se, CH=CH, O, C(CH$_3$)$_2$ (in the case of $y$ being CH=CH, the polymethenyl chain may also be linked in para-position to the nitrogen atom of the heterocyclic nuclei),
$r$=alkyl,
$n$=2 or 3,
X=halide, perchlorate, paratoluene sulfonate, alkylo-sulfate, nitrate, at least one carbon atom of the polymethenyl chain connecting the two heterocyclic nuclei being linked to an alkyl group, the remaining carbon atoms of the chain being linked to hydrogen, is sensitive to the red and infrared region of the spectrum apart from its individual sensitiveness.

Photographic silver halide emulsions sensitized in accordance with the invention attains a quite remarkable sensitiveness to the region of the spectrum comprising waves of about 550 to 1050$\mu\mu$. The pentamethinecyanines ($n$ in Forumla 1 being 2) impart to a silver-halide emulsion containing them a range of sensitivity extending from wave lengths of about 550 to 950$\mu\mu$ and the heptamethine cyanines ($n$ in Formula 1 being 3) impart to such an emulsion a range of sensitivity from about 650 to 1050$\mu\mu$. It will be seen that a prolongation of the polymethenyl chain causes a displacement of the range of sensitivity towards the region of longer wave lengths.

In the aforesaid general Formula 1 $y$ may represent sulfur, selenium, the vinyl group CH=CH, oxygen or C(CH$_3$)$_2$. V may take any position in the benzene nuclei, however, the 5 and 6 positions, and the 5' and 6' positions are preferred. In the case $y$ being CH=CH the 6 and 7, and 6' and 7' positions are preferred. V may represent an alkyl group such as methyl, ethyl, etc. or an alkoxyl group, for instance, a methoxy or ethoxy group, or halide, or benzene or a substituted amino group, for instance, acylated amino groups or OH. $r$ may be alkyl, for example, methyl, ethyl, propyl etc. X can be any suitable anion that will precipitate the dye, for instance, a halide, paratoluene sulfonate, alkylosulfate, perchlorate, nitrate or the like. The benzene nuclei may contain one or more of the substituents enumerated. The polymethenyl chain may be substituted by one or more alkyl groups, for instance, methyl groups.

The different radicals indicated for $y$ in Formula 1 cause a different sensitizing region of the dye, the remaining composition of the molecule being the same. Thus, for instance, the introduction of selenium or the vinyl group CH=CH into the molecule instead of sulfur causes a displacement of the range of sensitivity towards the region of longer wave length.

In the accompanying drawing there are reproduced 4 spectrograms of the same silver-bromide gelatin emulsion containing about 4 per cent of silver-iodide sensitized with different dyes as as follows:

Fig. 1 with bis-[3-ethyl-benzthiazole-(2)]-$\gamma$-methyl-pentamethinecyanine iodide;

Fig. 2 with bis-[3-ethyl-{naphtho-2'.1':4.5-thiazole}-(2)]-$\beta$-methyl-pentamethine-cyanine iodide;

Fig. 3 with bis-[3-ethyl-{naphtho-2'.1':4.5-thiazole}-(2)]-$\delta$-methyl-heptamethine-cyanine iodide.

The curves represent the range of sensitiveness of the sensitized emulsion in relation to its individual sensitivity, that is to say if the exposure of the emulsion had been prolongated the blackened area of both the curves shown in one graph would have been increased.

In the spectrograms the abscissae are graduated in millimicrons ($\mu\mu$) while the ordinates are graduated in divisions denoting the blackening of the tested film. The blackening is taken by exposing the film in a diffraction grating spectrograph of Carl Zeiss, Jena, provided with a Rowland diffraction grating, while illuminating with a 100 watt nitra lamp through a stage slot.

If the sensitizing maximum of the sensitized region of the emulsion lies at wave lengths over 800μμ, the camera is adjusted in such a manner that it sweeps over a range of wave lengths extending from about 600μμ to about 1100μμ, the camera being provided with an Agfa red filter No. 42 in order to screen off the spectra of a higher order. The stage slot has 6 stages and exposure is thus effected so that the 6th stage is just visible in the standard sensitiveness of the emulsion or in the range of sensitiveness imparted to the emulsion by the sensitizer if the camera is turned.

The dyes are obtainable according to the desired solubility in form of the bromide, iodide, perchlorate etc., and are used in a quantity such as is usual for the known sensitizing dyes. This quantity may amount to about 0.5 to 2 milligrams per 1 kg. of emulsion ready for being cast which contains about 9 per cent of gelatin, 4.5 per cent of silver-halide and the rest water. However, I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before casting.

The dyes may likewise be incorporated in the emulsion by coating the cast, but not dried, emulsion layer with a solution of the sensitizer in, for instance, aqueous or nonaqueous methyl alcohol or ethyl alcohol, applied by means of a coating roller. The concentration of the solution depends upon the speed of coating; for example, when the speed of coating amounts to 20 cm. per second, a suitable solution may consist of about 1 mg. of the sensitizer dissolved in 100 cc. of aqueous methyl alcohol of 50 per cent strength. Another method of incorporating the sensitizer in the emulsion consists in bathing the finished photographic material in a bath in which the dye is dissolved. Such a treatment may be as follows:—The photographic material to be sensitized is bathed in a solution containing 1 milligram of bis-[3-ethyl-(naphtho-2'.1':3.4-thiazole]-(2)]-β-methyl-pentamethinecyanine iodide in 500 to 1000 cc. of an aqueous solution of methanol of 50 per cent strength for about 5 minutes. The material is then dried, whereupon it is ready for use.

The dyes are suited for sensitizing an emulsion made according to the boiling process as well as for sensitizing an emulsion made according to the ammonia process.

The production of the pentacarbocyanines is analogous to methods disclosed in U. S. Patent 1,524,791 and the heptacarbocyanines are produced analogous to methods disclosed in German Patent 499,967 and will more clearly result from the following examples. The preparation of those of the bases serving as a starting material for the production of the dyes which have not yet been described in literature is analogous to that of the known bases.

The preparation of the substituted benzthiazoles may start from the correspondingly substituted amino-benzenes, which are converted by means of acetic anhydride into their acetyl compound. This latter is converted, according to the method of Jacobson and Süllwald (Berichte der Deutschen Chemischen Gesellschaft, vol. 21, page 2627) into the thioacet-compound by means of phosphorus-pentasulfide. By oxidation with potassium ferricyanide in alkaline solution the substituted benzthiazoles are obtained.

For the production of the 2-methyl-benzselenazoles substituted in the benzene nucleus which do not appear to have been yet described, the zinc salt of a correspondingly substituted ortho-amino-seleno-phenol of the formula

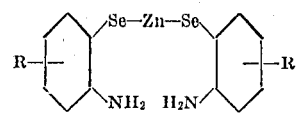

R=alkyl, oxalkyl, substituted amino-groups, halogen is boiled with acetic anhydride, or a disubstituted ortho-diamino-diphenyl-diselenide of the formula

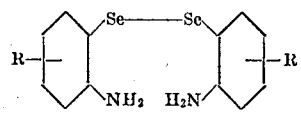

is boiled with acetic acid with addition of zinc dust.

Thus, for instance, for the production of 5-ethoxy-2-methyl-benzselenazole, the 1-amino-2-nitro-4-ethoxy-benzene is converted according to the method of Bauer (Berichte der Deutschen Chemischen Gesellschaft, vol. 46, 1913, pages 92–97), into 4.4'-diethoxy-2.2'-diamino-ortho-diphenyl-diselenide by way of the intermediate product 2-nitro-4-ethoxy-phenyl-seleno-cyanide. The diselenide is boiled with acetic anhydride and zinc dust whereby the 5-ethoxy-2-methyl-benzselenazole is formed.

In a completely analogous manner other benzselenazoles substituted in the benzene nucleus may be obtained.

The production of the benzthiazoles substituted by amino groups or substituted amino groups is described in the co-pending application Ser. No. 590,940, filed by Dieterle et al.

The following examples serve to illustrate my invention.

Example 1.—For producing the dye bis-[3-ethyl-benzthiazole-(2)]-γ-methyl-pentamethinecyanine iodide corresponding to the formula:

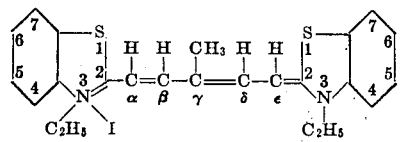

2 grams of 2-methyl-benzthiazole-ethyl-iodide and 1 gram of β-ethoxy-α-methyl-acrolein-acetal are heated in 5 cc. of dry pyridine for 30 minutes to 130° C. On addition of water the dye separates from the blue solution in form of green flakes. Recrystallization from alcohol yields green rods.

The alcoholic solution of the dye shows an absorption maximum at a wave length of about 650μμ.

Incorporated in a silver-bromide emulsion containing about 4 per cent of silver-iodide the dye imparts to it a range of sensitiveness from about 550 to 750μμ with a maximum at about 695μμ.

Example 2.—In a manner analogous to Example 1 there is obtained the dye bis-[3-ethyl-benz-selenazole-(2)]-δ-methyl-pentamethinecyanine iodide corresponding with the formula:

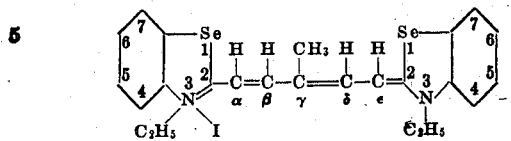

by starting from 2-methyl-benzselenazole-ethyl-iodide. The dye crystallizes from alcohol in bright green needles.

The alcoholic solution of the dye shows an absorption maximum at a wave length of about 668μμ.

Incorporated in a silver-bromide emulsion containing about 4 per cent of silver-iodide the dye imparts to it a range of sensitiveness from about 580 to 760μμ with a maximum at about 705μμ.

*Example 3.*—By heating 3 grams of 2-methyl-6-acetyl-amino-benzthiazole-diethylsulfate with 2 grams of β-ethoxy-α-methylacrolein-acetal in 10 cc. of pyridine to 130° C. the dye bis-[3-ethyl-6-acetylamino-benzthiazole-(2)]-γ-methyl-pentamethinecyanine monoethylsulfate corresponding with the formula

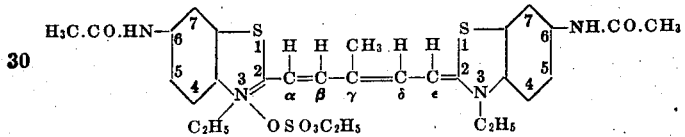

is obtained in form of green needles.

The alcoholic solution of the dye shows an absorption maximum at a wave length of about 670μμ.

Incorporated in a silver-bromide emulsion containing about 4 per cent of silver-iodide the dye imparts to it a range of sensitiveness from about 580 to 800μμ with a maximum at about 715μμ. The 2-methyl-6-acetylaminobenzothiazole whose diethyl sulfate is used in this example may be made by acetylating the 2-methyl-6-amino-benzothiazole described in the application Ser. No. 590,940.

*Example 4.*—The dye bis-[3-ethyl-{naphtho-2′.1′:4.5-thiazole}-(2)]-β-methyl-pentamethinecyanine iodide corresponding with the formula:

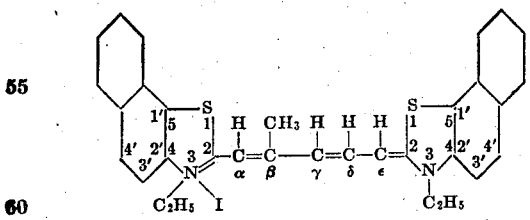

is obtainable by heating 2 grams of 2-methyl-β-naphthothiazole-ethyl-iodide with 2 grams of β-ethoxy-β-methylacrolein-acetal in 5 cc. of dry pyridine for about 15 minutes to 130° C. From the greenish brown solution the dye precipitates in form of a black powder on addition of water. The dye is separated by filtration, washed with acetone and recrystallized from alcohol.

The alcoholic solution of the dye shows an absorption maximum at a wave length of about 690μμ.

Incorporated in a silver bromide emulsion containing about 4 per cent of silver-iodide the dye imparts to it a range of sensitiveness from about 600 to 780μμ with a maximum at about 730μμ.

*Example 5.*—When using in Example 4 2-methyl-benz-selenazole-ethyl-iodide instead of 2 - methyl-β-naphthothiazole-ethyl-iodide, the dye bis-[3-ethyl-benzselenazole-(2)]-β-methyl-pentamethinecyanine iodide corresponding with the formula:

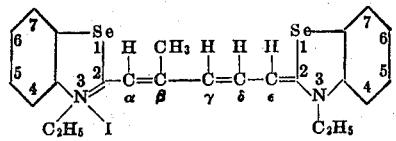

is obtained. The dye crystallizes from alcohol in form of a green crystal powder.

The alcoholic solution of the dye shows an absorption maximum at a wave length of about 665μμ.

Incorporated in a silver-bromide emulsion containing about 4 per cent of silver-iodide the dye imparts to it a range of sensitiveness from about 580 to 760μμ with a maximum at about 705μμ.

*Example 6.*—For producing the dye bis-[3-ethyl-benzthiazole-(2)]-β.γ-dimethyl-pentamethinecyanine iodide corresponding with the formula:

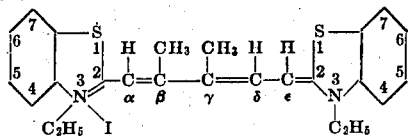

2 grams of 2-methyl-benzthiazole-ethyl-iodide and 1 gram of β-ethoxy-α.β-dimethyl-acrolein-acetal are heated in 5 cc. of pyridine for 10 minutes to 140° C. On addition of 5 cc. of an aqueous solution of potassium iodide of about 10 per cent strength the dye separates from the blue solution in pyridine in form of lustrous green thin plates.

The alcoholic solution of the dye shows an absorption maximum at a wave length of about 660μμ.

Incorporated in a silver-bromide emulsion containing about 4 per cent of silver-iodide the dye imparts to it a range of sensitiveness from about 560 to 760μμ with a maximum at about 700μμ.

*Example 7.*—The dye bis-[3-ethyl-benzthiazole-(2)]-β-methyl-heptamethinecyanine iodide corresponding with the formula:

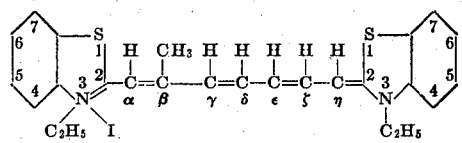

is obtainable by adding 0.25 cc. of diethylamine to a boiling mixture of 2 grams of 2-methyl-benzthiazole-ethyl-iodide and 1 gram of ε(β-naphthylimido)-α-(β-naphthylamino)-α-methyl-α.γ-pentadiene-hydrochloride in 5 cc. of alcohol and continuing with heating for about 10 minutes, whereupon the dye precipitates from the solution which has a bluish green color, in the form of dark-green thin plates having a metallic lustre.

Incorporated in a silver-bromide emulsion containing about 4 per cent of silver-iodide the dye imparts to it a range of sensitiveness from about 650 to 900μμ with a maximum at about 815μμ.

*Example 8.*—For producing the dye bis-[3-ethyl-6-diethyl-amino-benzthiazole-(2)]-δ-methyl-heptamethinecyanine perchlorate corresponding with the formula

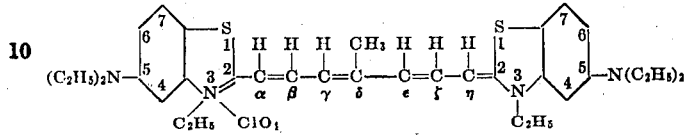

a mixture of 2 grams of 5-diethyl-amino-2-methyl-benzthiazole-ethyl-iodide and 1 gram of ε-phenylimido-α-phenylamino-(γ-methyl-α.γ-pentadiene)-hydrobromide in 10 cc. of alcohol is heated until boiling, and to the boiling mixture there is added 1 cc. of diethylamine. Heating is continued for about 10 minutes until the solution assumes a deep green color, there are then added 2 cc. of an aqueous solution of sodium perchlorate of about 10 per cent strength and a small quantity of ether. The dye separates in the form of thin plates having coppery luster. After filtration and thoroughly washed with acetone the dye is recrystallized from methanol.

Incorporated in a silver-bromide emulsion containing about 4 per cent of silver-iodide the dye imparts to it a range of sensitiveness from about 650 to 950μμ with a maximum at about 880μμ.

*Example 9.*—The dye bis-[3-ethyl-{naphtho-2'.1':4.5-thiazole}-(2)]-δ-methyl-heptamethinecyanine iodide corresponding with the formula:

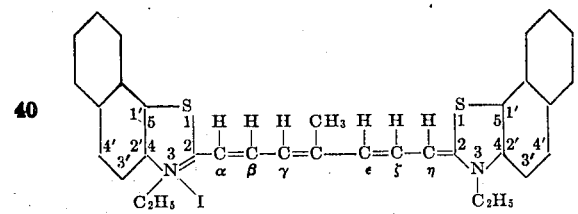

is produced as follows: A mixture of 5 grams of 2-methyl-β-naphthothiazole-ethyl-iodide and 3 grams of ε-phenylimido-α-phenylamino-(γ-methyl-α.γ-pentadiene)-hydrobromide in 50 cc. of alcohol is heated to boiling and to the boiling mixture there are slowly added 20 cc. of an alcoholic solution of sodium ethylate (containing about 2 per cent of sodium) whereupon the solution assumes a green color. After cooling the precipitated dye is separated by filtration and thoroughly washed with acetone. Recrystallization from methanol yields plates having a coppery luster.

Incorporated in a silver-bromide emulsion containing about 4 per cent of silver-iodide the dye imparts to it a range of sensitiveness from about 700 to 920μμ with a maximum at about 860μμ.

*Example 10.*—For the production of the dye bis-[1-methyl-quinoline-(4)]-δ-methyl-heptamethinecyanine perchlorate corresponding with the formula:

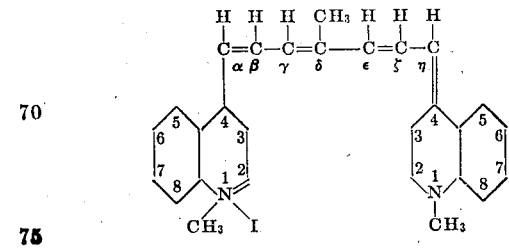

2 grams of lepidine-methyl-iodide and 1 gram of ε-phenylimido-α-phenylamino-(γ-methyl-α.γ-pentadiene)-hydrobromide in 10 cc. of alcohol are heated to boiling and the boiling solution is mixed with 0.2 cc. of dimethylamine. Heating is continued until the mixture assumes a dark-green color, there are then added 2 cc. of an aqueous solution of sodium perchlorate of about 5 per cent strength. On cooling the dye precipitates on the walls of the vessel as a coating having a coppery luster.

Incorporated in a silver-bromide emulsion containing about 4 per cent of silver-iodide the dye imparts to it a range of sensitiveness from about 700 to 1050μμ with a maximum at about 960μμ, which however, is not sharp.

α(β-naphthylimino)-ε-(β-naphthylamino)-α-methyl-α.γ-pentadiene-hydrochloride may be made according to König, Journal für praktische Chemie, vol. 69, page 136, from β-naphthylamine, α-picoline and cyanous chloride in etheric solution. In an analogous manner ε-phenylimido-α-phenylamino-γ-methyl-α.γ-pentadiene-hydrobromide is obtained from cyanous bromide, aniline and γ-picoline.

*Example 11.*—bis-[3-methyl-benzthiazole-(2)]-α.ε-dimethyl-pentamethinecyanine iodide corresponding with the formula:

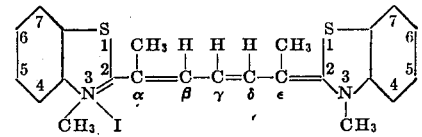

is obtainable by heating 2 grams 2-ethyl-benzthiazole-methyl-iodide with 1 cc. of β-ethoxyacrolein-acetal in 5 cc. of pyridine for about 15 minutes to about 130° C. From the dark-green reaction mixture the dye precipitates in the form of blue-green flakes on addition of water. By recrystallization of the crude material from methanol there are obtained steel-blue, felted needles.

The alcoholic solution of the dye has an absorption maximum at about 665μμ.

By incorporating the dye in a silver-halide emulsion the latter acquires a sensitiveness to waves from about 610μμ to 760μμ with a maximum at about 715μμ.

It is to be understood that my invention is not limited to the foregoing examples or to the specific details given therein. Numerous other embodiments are possible and I contemplate as included within my invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. Numbering of the thiazoles etc. commences from the sulfur etc., numbering of the quinoline nuclei and of the dyes commences from the nitrogen atom. The formulae of the dyes as given herein represent the molecular structure of my new dyes so far as known. If, however, in the future it should become evident that the formulae do not exactly correspond to the dyes, this fact will not affect my invention since the dyes will be easily identified by the method of producing the same which has been fully described in the examples and is analogous to known methods.

What I claim is:

1. A photographic material comprising a silver-halide emulsion containing a sensitizing material which comprises a [benzthiazole-(2)]-pentamethinecyanine the pentamethenyl chain of which is substituted by an alkyl group.

2. A photographic material comprising a silver-halide emulsion containing a sensitizing material which comprises a [benzselenazole-(2)]-pentamethinecyanine the pentamethenyl chain of which is substituted by an alkyl group.

3. A photographic material comprising a silver-halide emulsion containing bis-[3-ethyl-benzthiazole-(2)]-γ-methyl-pentamethinecyanine iodide.

4. A photographic material comprising a silver-halide emulsion containing bis-[3-ethyl-benzselenazole-(2)]-β-methyl-pentamethinecyanine iodide.

5. A photographic material comprising a silver-halide emulsion containing a sensitizing material which comprises a pentamethinecyanine, the pentamethenyl chain of which is substituted by an alkyl radical.

6. A photographic material comprising a silver-halide emulsion containing a sensitizing material which comprises a pentamethinecyanine, the pentamethenyl chain of which is substituted by a methyl radical.

7. A photographic material comprising a silver-halide emulsion containing bis-[3-ethyl-6-acetyl-amino-benzthiazole-(2)]-γ-methyl-pentamethinecyanine-monoethylsulfate.

WALTER ZEH.